United States Patent [19]

Doty

[11] Patent Number: 4,708,366
[45] Date of Patent: Nov. 24, 1987

[54] SEAT BELT RETRACTION APPARATUS WITH REMOTE INERTIA SENSOR

[75] Inventor: Gerald A. Doty, Crown Point, Ind.

[73] Assignee: Gateway Industries, Inc., Olympia Fields, Ill.

[21] Appl. No.: 835,605

[22] Filed: Apr. 11, 1986

[51] Int. Cl.⁴ ............................................. B60R 21/10
[52] U.S. Cl. ..................................... 280/803; 280/807
[58] Field of Search ............... 297/477, 475, 479, 480; 280/803, 804, 806, 808, 801

[56] References Cited

U.S. PATENT DOCUMENTS

| | | | |
|---|---|---|---|
| 3,764,161 | 10/1973 | Bright | 280/803 |
| 3,797,603 | 3/1974 | Loomba | 180/268 |
| 4,181,326 | 1/1980 | Hollowell | 280/803 |
| 4,209,186 | 6/1980 | Close | 280/803 |
| 4,315,639 | 2/1982 | Booth | 280/803 |
| 4,361,294 | 11/1982 | Doty | 280/802 |
| 4,461,493 | 7/1984 | Doty | 280/807 |
| 4,570,873 | 2/1986 | Kurtti | 280/803 |

*Primary Examiner*—Richard A. Bertsch
*Attorney, Agent, or Firm*—Fitch, Even, Tabin & Flannery

[57] ABSTRACT

Seat belt retraction apparatus including a seat belt retractor mechanism including a reel about which the strap of a seat belt is wound and which carries ratchet wheels. The retractor mechanism is adapted to take up and let out the strap and is provided with an inertia weight locking mechanism to lock the reel against paying out the strap. The retractor mechanism is for mounting in a vehical door and the inertia locking mechanism will not lock the reel at a lower force level such as 0.7G, when the door is swung. However, the retractor mechanism will operate at this lower 0.7G level to lock the reel against belt pay out when the vehicle chassis decelerates at a 0.7G level as at the time of an accident. Preferably, an inertia operable switch is located on the vehicle chassis but at a location not effected by the swinging of the vehicle door. A magnetic force holds the inertia weight locking mechanism against locking as the door is swung at the lower force level of 0.7G and in a range up to 2.4G at which time the magnetic force is overcome. At the time of an accident at the lower force level of 0.7G, the inertia switch operates an electromagnetic device in opposite to the permanent magnetic field so that inertia weight locking mechanism may lock the reel at this lower force level.

16 Claims, 11 Drawing Figures

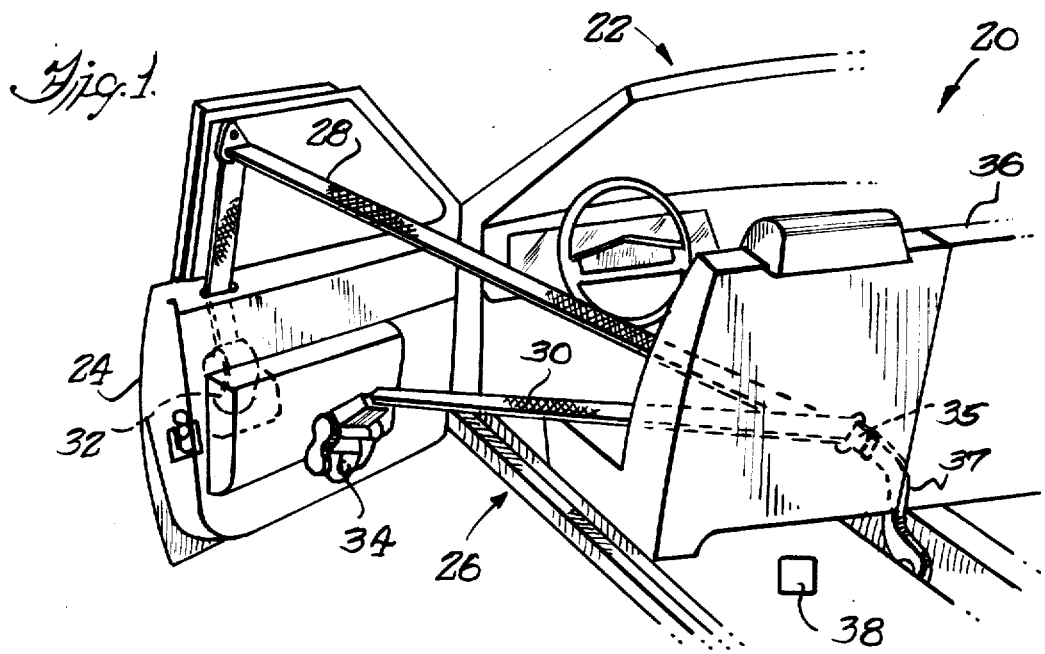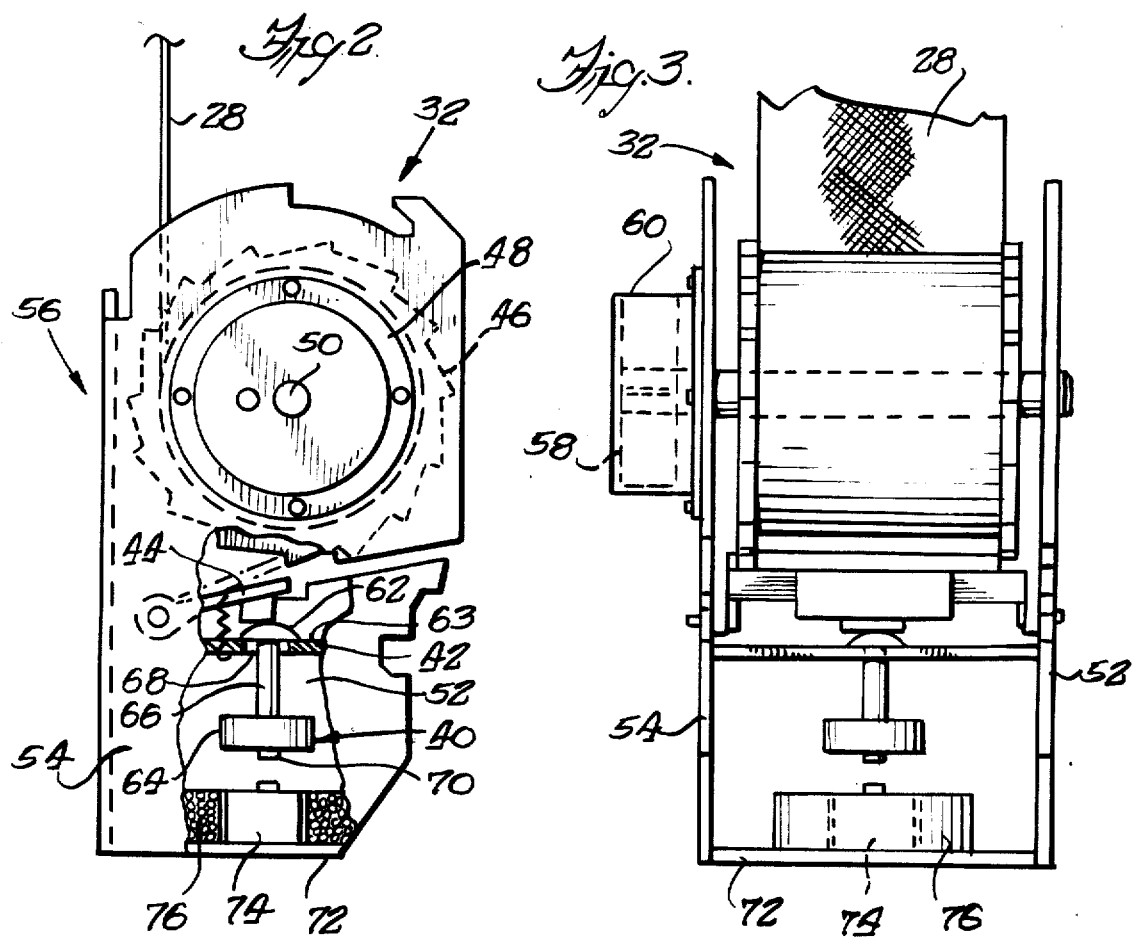

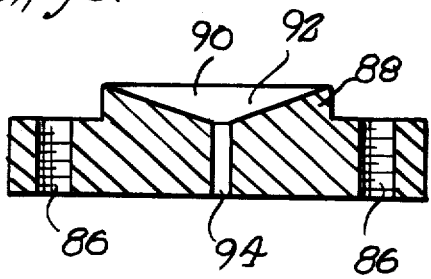
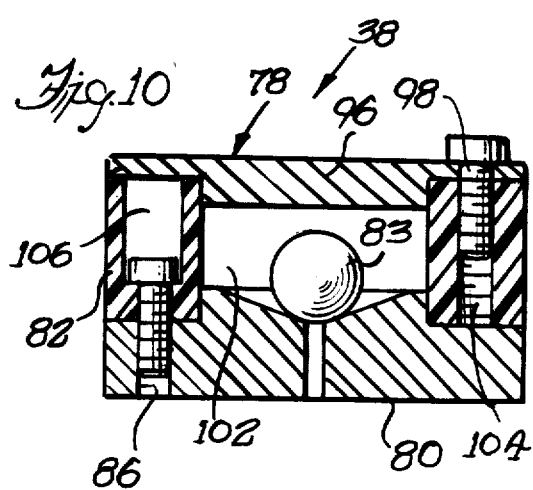
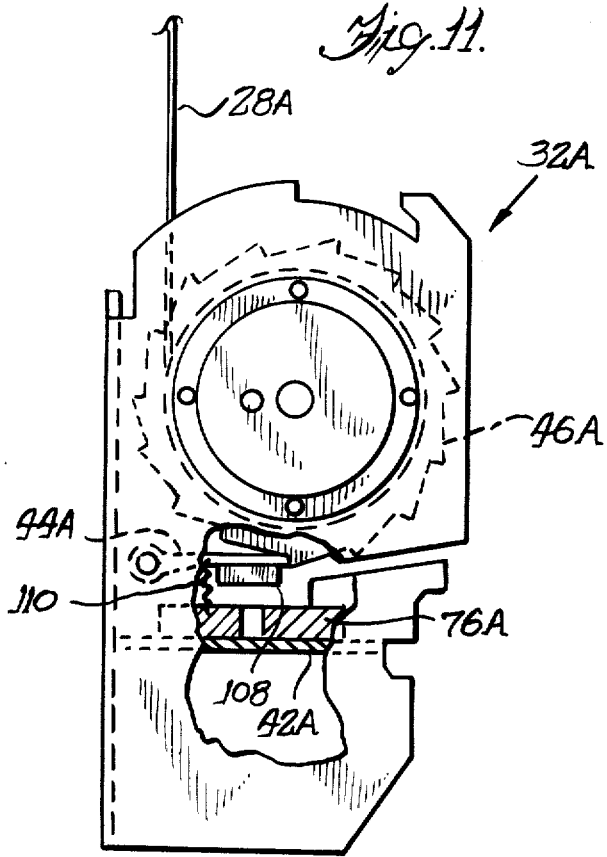

SEAT BELT RETRACTION APPARATUS WITH REMOTE INERTIA SENSOR

The present invention relates to seat belt retraction apparatus and, more specifically, to such apparatus including a locking mechanism having an inertia mounted switch remote from the retractor mechanism.

BACKGROUND OF THE INVENTION

This invention is directed to a seat belt retractor mechanism which is particularly useful in a passive retraint type of system which includes a retractor mechanism mounted in a door of a vehicle. A sudden opening of the door will cause the inertia locking retractor to automatically lock and thereby prevent the seat belt from unwinding as intended during the door swinging movement whereby the door movement is abruptly halted because of the stopping of the seat belt unwinding movement. A number of proposals have been suggested for blocking operation of the inertia mechanism and the locking mechanism so that the seat belt may continue to be paid out even though the door is accelerated at a G-force which would operate the inertia locking mechanism. For instance, mechanically spring biased plungers are movable upon opening of the door to operate linkages extending in the door to the retractor mechanisms, but such plunger operated linkages are too slow in operation. Also it has been suggested to use a solenoid device to block the retractor's inertia operated locking mechanism with the solenoid being energized upon electrical contacts closing as the door is opened. Such solenoid devices use electrical power and, if the door remains open for a long period of time there will be a considerable drain on the battery. It will be appreciated that it is preferred that the electrical operation be kept to a minimum period of time so as not to be a burdensome drain on the vehicle battery or electrical system.

When the inertia operated retractor is mounted in a door, it is desirable that it be blocked out from locking from the normal locking force level, e.g., 0.6 or 0.7G to a higher locking force level, e.g., of 3 or 4 G's. That is, at very high loads of 3 or 4 G's or above it, it is desirable from a fail-safe operation that the locking retractor lock the belt against protraction to assure that the passenger will always be protected. The fast swinging of the door will only generate 0.7G or slightly above and should not generate inertia forces of the magnitude of the higher level. Any such block out system should not be the source of electrical drain on the vehicle's battery whether the vehicle door is opened or closed for long periods of time.

SUMMARY OF THE INVENTION

Among the aspects and objects of the present invention will be noted the provision of an improved seat belt retraction apparatus. With this apparatus only a single inertia sensor is preferably mounted on the vehicle chassis and it controls a plurality of seat belt retraction mechanisms mounted in the vehicle doors. The retractor mechanism has a dual G-force operating level so that the mechanism operates to lock at a normal, lower G-force level when the door is closed and the ignition is on. When the ignition is off and the door is opened, the retractor mechanism will still function, but at a higher G-force level than that associated with abruptly opening the door. The apparatus of the present invention is reliable in use, has long service life, and is relatively simple and economical to manufacture. Other aspects and features of the present invention will be in part apparent and in part pointed out hereinafter in the following specification and accompanying claims and drawings.

Briefly, the seat belt retraction apparatus of the present invention includes a seat belt retraction mechanism including a reel about which the strap of the seat belt is wound and which is adapted to take up and let out the strap. The apparatus includes an inertia operated locking mechanism for locking the reel to prevent the reel from paying out the strap. The locking mechanism is moveable between a first or inactive position in which the belt is free extraction and retraction and a second position wherein locking mechanism prevents extension of the belt. The preferred means for providing this dual force level operation comprises an inertia weight carrying magnetizable material, and a first magnet is positioned adjacent this material for generating a first magnetic field which attracts the magnetizable material to bias the pawl to its first position which requires a G-level force for operation. An electromagnet is also positioned adjacent the magnetizable material for generating a second magnetic field which is opposite in sense to the first field so that the inertia mechanism may operate at the lower 0.7G force level. The apparatus also includes an inertia switch mounted on the vehicle chassis and an electrical circuit interconnecting the switch and the electromagnet for selectively energizing the electromagnet.

BRIEF DESCRIPTION OF THE DRAWINGS

FIG. 1 illustrates a vehicle having a passive restraint system including a seat belt retraction apparatus embodying various features of the present invention and including one or more seat belt retraction mechanisms, a remotely mounted inertia switch, and an electrical circuit interconnecting the switch and the mechanism;

FIG. 2 is a side elevational view of the belt retraction mechanism, incorporating a magnetically biased pendulum included in the apparatus of FIG. 1;

FIG. 3 is a front elevational view of the belt retraction mechanism of FIG. 2;

FIG. 9 is a sectional view of the base taken generally along line 9—9 of FIG. 7;

FIG. 10 is a cross-sectional view showing the assembled inertia switch;

FIG. 11, similar to FIG. 2, illustrates an alternative embodiment of the belt retractor mechanism wherein energization of an electromagnetic repels a magnet carried by the pawl causing the pawl to lock the retraction mechanism.

Corresponding reference characters indicate corresponding components throughout the several views of the drawings.

DESCRIPTION OF THE PREFERRED EMBODIMENT

Figure 4:
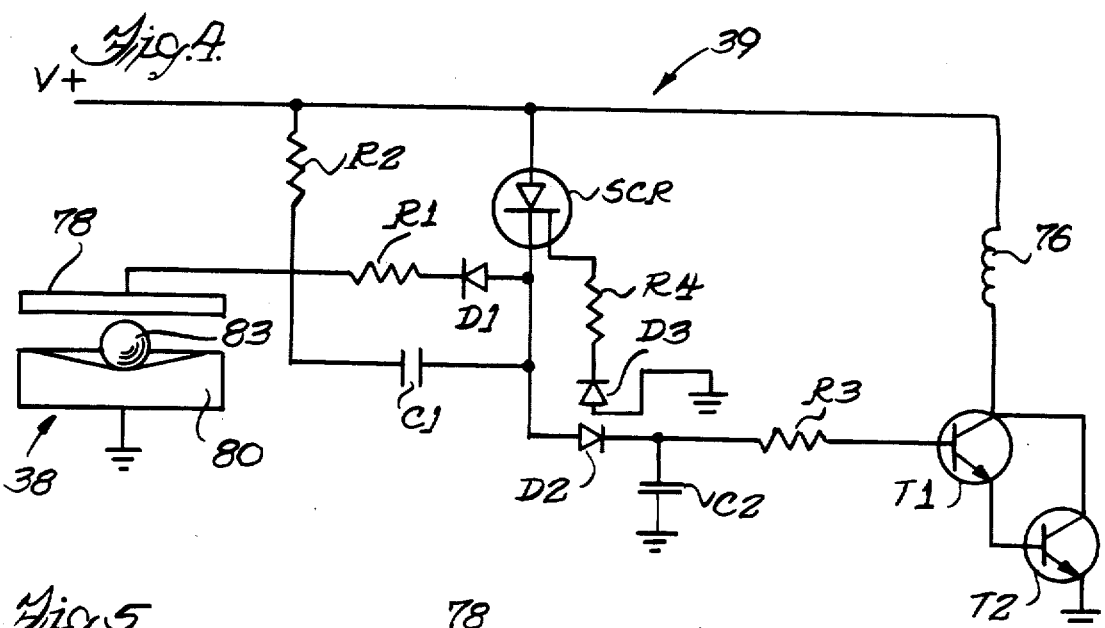
FIG. 4 is a schematic electrical circuit diagram illustrating the inertia switch interconnected with the electrical circuit for selectively energizing an electromagnetic coil in the belt retraction mechanism.

Referring now to the drawings, seat belt retraction apparatus embodying various features of the present invention is generally indicated in FIG. 1 by reference numeral 20. The apparatus 20 is for use in a vehicle 22 having at least one door 24 and a chassis 26. As used herein, the term "seat belt" is to be accorded its broad meaning which includes a shoulder strap or portion 28 and/or a lap portion or belt 30. As shown in FIG. 1, the seat belt retraction apparatus 20 includes a seat belt retractor mechanism 32 for the shoulder strap and a retractor mechanism 34 for the lap belt. The retractor mechanisms are mounted on the door 24 to form part of a passive restraint system which functions to hold a vehicle occupant without his or her taking any steps to strap in, such as extending a belt and inserting a metal tongue attached to that belt into an anchored buckle. Upon the occupant closing the door, the strap 28 and belt 30 are moved about the occupant and slack is taken up by mechanisms 32 and 34.

The distal ends of the strap 28 and the belt 30 may be held by anchoring buckles 35 disposed adjacent the center of the front seat 36 and the retractor mechanisms have rewinding means to take up the slack as the seated occupant swings the door 24 closed. Alternatively, the strap 28 and the belt 30 could be two runs of a length of webbing the end of which are held by the mechanisms 32, 34. The loop formed could be held in an opening at one end of a tongue for reception by an anchored buckle 37. The apparatus 20 further includes an inertia switch 38 mounted on the chassis 26 and interconnected with an electrical circuit 39, shown in FIG. 4, for controlling operation of the retractor mechanisms 32, 34 upon the vehicle experiencing a sudden change in velocity to lock the mechanisms from paying out their respective strap and belt. Thus, the restraint system prevents the occupant from being thrown forward in the event of a crash.

As the retractor mechanisms 32 and 34 may be substantially identical, only mechanism 32 need be described in any detail. The retractor mechanism 32 is of the inertia operated kind which comprises an inertia weight 40 which could be of a toppling type but herein is in the form of a pendulum inertia weight. The latter as illustrated in FIGS. 2 and 3 mounted on support bar 42 for swinging movement to operate a pivotally mounted locking bar or pawl 44 to pivot into locking engagement with a pair of ratchet wheels 46 mounted on opposite sides of a webbing reel 48 mounted for rotation on a reel shaft 50 extending between opposite vertical frame sides 52 and 54 of a retractor frame 56. The reel shaft 50 is journaled to rotate in the side frames 52 and 54 and a spirally wound clock-like spring 58 is attached to one end of the reel shaft 50 to rewind the seat belt. This rewind spring 58 is mounted within a protective cover 60 attached to the side frame 54. The pawl 44 is pivotal between a first position (shown in FIG. 3) wherein the pawl 44 is out of engagement with the ratchet wheels 46, and a second or locking position (shown in FIG. 2) wherein the pawl 44 engages the teeth of the ratchet wheels 46 to lock the retractor mechanism 32 against extension of the belt 28. For further information regarding the structure and operation of retractor mechanisms having such reels, ratchet wheels and pawls, reference may be made to commonly assigned U.S. Pat. Nos. 4,361,294 and 4,461,493, the teachings of which are incorporated herein by reference.

The pendulum 40 includes an enlarged head 62 which is rockable on the upper surface 63 of the support bar 42, a weighted lower end 64, and a stem 66 passing through an aperture 68 (having an inside diameter larger than the outside diameter of the stem so that the stem can freely move in the aperture) and interconnecting the head 62 and the lower end 64. In accordance with the present invention, the aperture) and operated locking mechanism allows the door to be swung open at accelerations above 0.7G without locking the belt pay out and yet, at the time; of an accident the inertia mechanism will lock the reel against pay out at the lower force of 0.7G. This is achieved by having the inertia operated locking mechanism operate only at a high force level, e.g. 2.4G's when the door is swung open and then by reducing the force level requirement to 0.7G at the time of an accident. Herein, an inertia switch means is mounted on the vehicle, so as not to be effected by the door's acceleration, and operable at the lower 0.7G force level applied to the vehicle chassis to cause a change in the amount of force need to operate the inertia locking mechanism for the belt reel.

The retractor locking mechanism is readily locked at the time of an accident at this lower force level by the inertia weight operated locking mechanism. The change is force level operation is achieved in the present invention by the use of a first magnetizing means which is associated with the inertia weight operating means to hold the same against operation except at a higher force level, for example, at about 2.4G's. An electromagnetic means operates in opposition to the first magnetic means at the time of an accident to cancel at least a portion of a permanent magnetic attraction so that the inertia weight means is able to lock up the retractor at the lower force level of 0.7G.

The preferred form of the first magnetic means includes a magnetizable means which may take the form of a piece of steel 70. The retractor frame 56 also has a base plate 72 interconnecting the lower ends of the frame sides 52, 54. Mounted on the base plate 72 is a permanent magnet 74 which attracts the piece of steel 70.

Without the presence of the steel 70 and the magnet 74, the pendulum could be designed to swing sufficiently to move the pawl to its locking position upon experiencing a deceleration of 0.7G. With the steel 70 and the magnet 74, the pendulum is biased against swinging so that a force of 2.5 to 3 Gs would be required to move the pendulum sufficiently to lock the retractor mechanism 32.

Also disposed supported on the base plate 70 and concentric with the permanent magnet 74 is a coil 76 which, upon proper energization, forms an electromagnet which provides a magnetic field which is in the opposite sense (polarity) to that provided by the permanent magnet 70. Thus, energization of the coil 76 may result in total cancellation of the field of the permanent magnet so that the pendulum 40 moves to lock the retractor mechanism under the lower force of 0.7G.

One advantage of biasing the pendulum 40 against swinging to lock the retractor mechanism until the higher G-force is experienced has to do with the mounting of the retractor mechanism in the vehicle door 24 as part of a passive restraint system. If the retractor locks at the lower G-force, a rapid opening of the door could swing the pendulum 40 to lock the retractor mechanism. This would prevent pay out of the strap resulting in interference with movement of the door and stopping the occupant as he or she is in the act of getting out of the seat.

It will be appreciated that in the higher force condition, no energization of the coil is required. This is in sharp contrast to prior art lockout mechanisms which not only fail to provide the higher G-force operation feature, but also require energization of a solenoid to prevent operation of the retractor mechanism. Thus, the present invention will not keep a solenoid energized if the door is left open for an extended period of time which would cause a drain on the vehicle battery. The system operates at higher force level if the electrical power should fail and hence acts as a fail safe system not needing electrical power.

Figure 5:
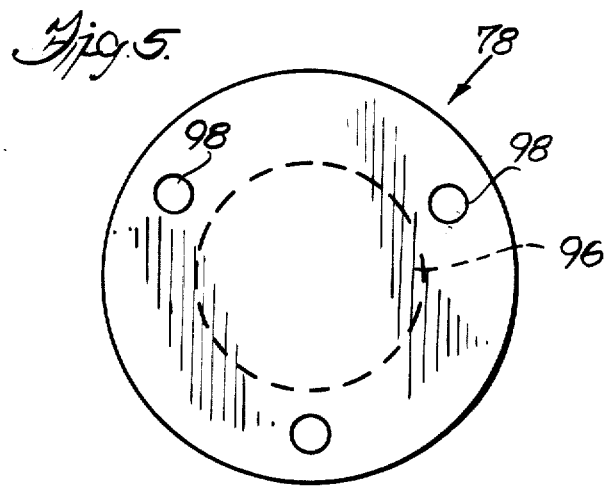
FIGS. 5, 6 and 7 are plan views of a cap, a spacer and a base, respectively, of the inertia switch of FIG. 4.
Figure 6:
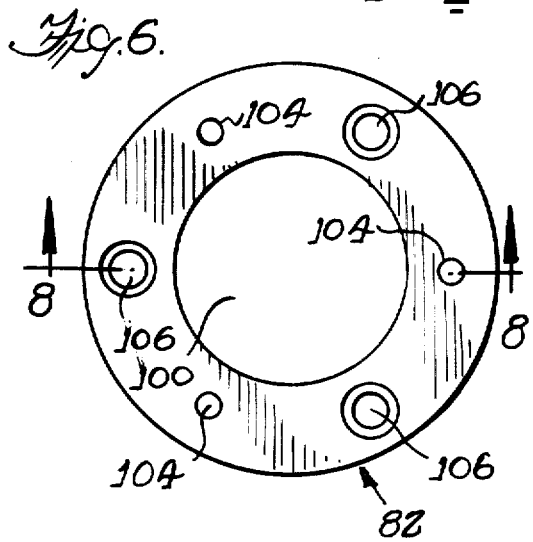
Figure 7:
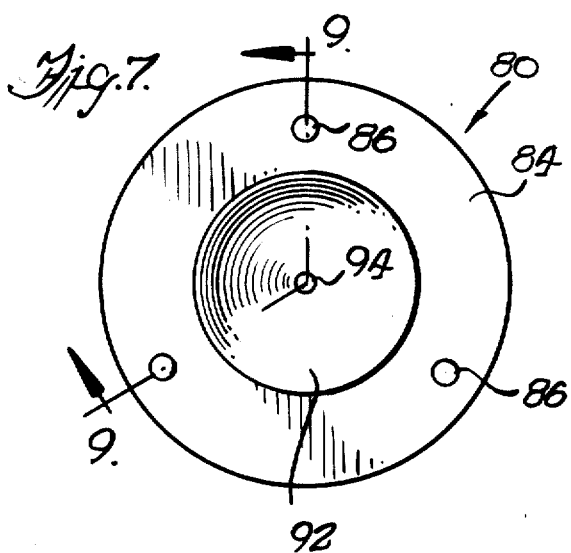
Figure 8:
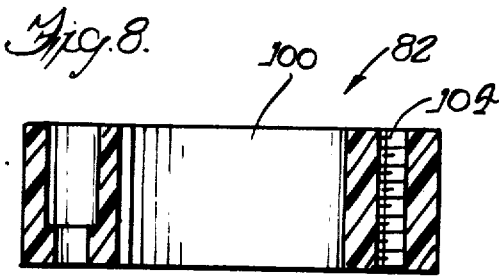
FIG. 8 is a cross section of the spacer taken generally along line 8—8 of FIG. 6.

Referring to FIGS. 5 thru 10, the inertia switch 38 includes a conductive cap 78 best shown FIG. 5, a conductive base 80 best shown in FIGS. 7 and 9, and an insulative spacer 82 best shown in FIGS. 6 and 8. The inertia sensor also includes a metallic ball 83 for commonly engaging the cap 78 and the base 80 upon the switch experiencing a deceleration to provide a closed circuit condition. The ball 83 is preferably formed of steel while the base 80 and cap 78 are of aluminum, and the spacer is formed of a polycarbonate. The base 80 includes a peripheral mounting flange 84 having a trio of threaded mounting apertures 86 regularly spaced thereabout. The base also includes a elevated central portion 88 having a concavity 90 defined by a annular ramp surface 92. The base also includes a drain opening 94 extending downwardly from the center of the concavity. The cap 78 includes a central extension 96 facing the central portion of the base. The cap 78 is also provided with three spaced fastener-receiving openings 98 spaced 120 degrees apart adjacent the periphery of the cap. The spacer 82 is generally cylindrical having a central opening 100 for receiving the extension 96 of the cap and the central portion 88 of the base, and defining therewith a chamber 102 for containing the metallic ball 83. The wall of the spacer includes three threaded apertures 104 and three counterbore apertures 106, the two types of apertures being arranged so that each adjacent aperture is of the opposite type.

The threaded apertures 104 are for alignment with the fastener-receiving openings 98 of the cap while the counterbore apertures 106 are for alignment with the threaded mounting apertures 86 of the base. The situation to be avoided is for mounting screws holding the base and the spacer, and the screws holding the cap to the spacer to be in alignment because if this were the case, the ends of aligned screws could contact thereby shorting the base and cap. The particular arrangement of the inertia switch components assists the assembler in avoiding this. More specifically, the base and spacer are first assembled with the base threaded apertures 86 being aligned with the counterbore apertures 106. After the screws inserted through the larger upper portions of the counterbore 106 have been advanced into threaded apertures 86 to hold the two parts together, the assembler can visually inspect that the screws are properly located. After the ball 83 is loaded, the cap is aligned with the spacer. If the cap openings 98 are improperly aligned, that is, if they are aligned with the counterbores rather than the threaded apertures 104, a properly sized threaded screw would not engage but would merely hang down because neither the openings 98 nor the enlarged ends of the counterbores have a screw thread. This would provide an indication to the assembler that the cap was improperly aligned with the spacer.

Referring to FIG. 4, the electrical circuit 39 includes a silicon control rectifier SCR the anode of which is connected to the positive voltage terminal V+ of the vehicle's battery. The cathode of the SCR is connected to the cap 78 of the inertia switch 38 thru a resistor R1 and a diode D1. A capacitor C1 parallels the series combination of the resistor R1 and the diode D1, and the capacitor C1 is connected to V+ through a resistor R2. Furthermore, the SCR cathode is connected to the base of a transistor T1 through a blocking diode D2 and a resistor R3. The junction of the diode D2 and the resistor R3 is connected to ground through a capacitor C2. Transistor T1 is interconnected with a second transistor T2 as a Darlington pair with the emitter of the transistor T2 grounded to the vehicle chassis and the collectors of the transistors commonly connected to V+ through the coil 76. The gate of the SCR is connected to the vehicle chassis ground through a resistor R4 and a diode D3.

Operation of the circuit 39 is as follows: The capacitor C1 charges to V+ through the resistor R2. Upon the vehicle experiencing a change in velocity, the ball 83 moves up the ramp surface 92 commonly to contact the metallic cap 78 and base 80. When this contact is made the capacitor C1 discharges through a circuit including the inertia switch 38, the chassis ground, the diode D3, the resistor R4 and the gate-cathode circuit of the silicon control rectifier. The effect of this is that the silicon control rectifier is gated on, which establishes a current path to ground through diode D1, resistor R1 and the inertia switch 38. Additionally, current flowing through the SCR and the blocking diode D2 charges the capacitor C2. When this capacitor C2 is charged sufficiently that the threshold of the base-emitter circuit of transistor T1 is reached, transistor T1 turns on which results in transistor T2 also having its collector-emitter circuit rendered conductive. With transistors T1 and T2 conducting, the coil 76 is energized which produces a magnetic field counteracting that of the permanent magnet 74 to switch the operational state of the pendulum so that it will operate to move the pawl to its locking position upon experiencing the lower G-force.

When the force of gravity causes the ball 83 to move out of contact with the cap 78, the transistors T1 and T2 will not immediately turn off. Movement of the ball 83 out of mutual contact with the cap 78 and base 80 results in interruption of the SCR cathode circuit to ground including diode D1 and resistor R1. Assuming that the capacitor C2 is charged when the ball 83 disengages the cap 78, the current flowing through the SCR drops below its sustaining level, and the SCR will turn off. However, the Darlington pair transistors T1 and T2 will not immediately turn off to de-energize the coil 76. This will be determined by the time constant associated with capacitor C2 and resistor R3. After expiration of this time, preferably about two seconds, the voltage level at the base of the transistor T1 drops sufficiently that transistor T1 turns off which in turn switches transistor T2 off thereby de-energizing the coil 76 and allowing the retraction mechanism to return to its higher G-force operating state. In the event that the capacitor C2 is not fully charged at the time the ball 83 moves out of contact with the cap 78, the SCR will remain on for a short time until the capacitor C2 is charged. Then it will turn off because the current flow through the SCR will drop below the sustaining level. The capacitor C2 will then discharge and the time will be as described above.

It will be appreciated that the use of the inertia switch 38 and associated electrical circuit 39 permits a single inertia switch to control a number of retractor mechanisms. Also it will be appreciated that with the vehicle at rest and the ignition turned off, no energization of the coil 76 is required to place the retractor mechanism 32 at its higher G-load state of operation.

Referring to FIG. 11, an alternate embodiment 32A of the shoulder retractor mechanism is shown. Components of the retractor of mechanism 32A corresponding to components of retractor of mechanism 32 are indicated by the numeral assigned to the component of the retractor mechanism 32 with the addition of the suffix "A". Rather than being operated by a pendulum, the pawl 44A carries a magnet 108. This magnet has a polarity which is opposite the polarity established by energization of the coil 76A. Thus when the coil 76A is energized the magnet 108 and the pawl 44A carrying the magnet will be repelled causing the pawl 44A to move into its locking position with the teeth of the ratchet wheels 46A thereby preventing extension of the strap 28A. A spring 110 connecting the pawl to the support bar 42A is provided to bias the pawl to its first position upon de-energization of the coil 76A. The magnet 108 will attract the steel core of coil 76A and hold it tight against rattling.

The advantage of the retractor mechanism 32A is that fewer components are required because the pendulum arrangement 40 is not included. Another advantage is this retractor can be mounted at any angle because the permanent magnet will attract and will hold the pawl in its released position and likewise the repulsion will be accomplished in all positions. A disadvantage of the retractor mechanism 32A is that it lacks the dual G-force operation of the retractor mechanism 32.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a seat belt retracting mechanism for mounting on a vehicle having a movable door, the combination comprising:
    a seat belt retracting mehanism for mounting on the door including a reel about which a seat belt is wound and which is adapted to rotate to take up or pay out the belt,
    a locking means for said reel movable between an unlocked position in which the reel is free to turn to pay out the belt and a locking position in which the reel is prevented from rotating to pay out the belt.
    an inertia operating means including an inertia weight operable to move the locking means to its locking position in response to first and second levels of force operation,
    said first force level of operation being at a higher force level and being effective when the door is opened and when the door is closed and said second force level being a lower force level,
    and electrically operated means including an inertia operated switch means mounted on the vehicle and operable upon sudden acceleration or deceleration of the vehicle for reducing the force level from the higher first level to the lower second level at which the inertia weight and inertia operating means operates the locking means to lock the reel.

2. An apparatus in accordance with claim 1 in which said inertia operated switch means actuates the electrically operated means to cause the inertia weight to operate at the lower force level, and in which said inertia operating means includes an electromagnetic means operated by said inertia operated switch means to cause the inertia operating means to operate at the lower force level.

3. An apparatus in accordance with claim 2 including a permeanent magnetic in said inertia operating means cooperating with said inertia weight to require the higher force level for operation by the inertia weight,
    said electromagnetic means operating in opposition to the magnetic force of said permanent magnet to allow operation at the lower force level.

4. A seat belt apparatus for use in a vehicle having a door and a chassis, said apparatus comprising:
    a seat belt retractor mechanism adapted to carried by said door,
    a reel mounted in said seat belt retractor mechanism for rotation to take up or to pay out a belt thereon,
    locking means movable from a non-locking position to a locking position for locking the reel against rotation to pay out the belt,
    an inertia weight means for operating the locking means to the locking position,
    first magnetic means associated with the inertia weight means to hold the inertia weight means against operation at the lower predetermined force level to prevent the locking means from operation when the door is closed and when the door is being opened and accelerating the inertia weight at the lower force level,
    an inertia switch means mounted on the vehicle chassis and operable upon a predetermined acceleration or deceleration of the vehicle chassis,
    electromagnetic means operable by said inertia switch means at the predetermined acceleration or deceleration of the vehicle chassis as at the time of an accident to oppose the magnetic field of the first magnetic means so that the inertia weight is able to operate the locking mechanism to lock the reel at a second lower force level.

5. An apparatus in accordance with claim 4 in which the first magnetic means comprises a permanent magnet for attracting the inertia weight means and requiring several times the force of the lower level force before operating the locking means when the electromagnetic means is not operating in opposition to the magnetic force.

6. An apparatus in accordance with claim 5 in which the electromagnetic means to reduce the permanent magnet retraction includes an electrical circuit means,
    said electrical circuit means being operated by said inertia switch means to energize the electromagnetic means to cancel at least the portion of the force being generated by the permanent magnet so that the inertia weight means may operate at the lower force level at the time of an accident.

7. Seat belt retraction apparatus for use in a vehicle having a door, said apparatus comprising:

a seat belt retractor mechanism including a reel about which the strap of the seat belt is wound and which is adapted to take up and pay out said belt strap, said reel carrying ratchet means, said mechanism further including pawl means engageable with said ratchet means to prevent said reel from paying out said belt strap, said pawl means being movable between a first position in which said pawl means is out of engagement with said ratchet means and a second locking position wherein said pawl means engages said ratchet means to prevent pay out of said belt strap, said pawl means including magnetizable means;

a first magnet means positioned adjacent said magnetizable means for generating a first magnetic field for biasing said pawl means toward its first position;

a second magnet means positioned adjacent said magnetizable means for generating a second magnetic field which is opposite in sense to said first magnetic field, said second magnet means comprising an electromagnet; and means including an inertia operated electrical switch movable upon a predetermined acceleration or deceleration for selectively energizing said electromagnet to reduce the amount of force needed to move the pawl to its second locking position when the door is closed.

8. Apparatus as set forth in claim 7 wherein said first magnet means comprises a permanent magnet.

9. Apparatus as set forth in claim 7 wherein said pawl means comprises an inertia sensor and a pawl, said inertia sensor including a pendulum having a gravity-biased position and with movement of said pendulum from said gravity-biased position resulting in said pawl moving to said second position said pendulum carrying said magnetizable means.

10. Apparatus as set forth in claim 9 wherein said first magnet means provides a higher field strength than does said electromagnet whereby the degree to which said pawl means is biased to its first position is varied due to energization of said electromagnet.

11. Apparatus as set forth in claim 7 wherein said means for selectively energizing includes a circuit comprising an inertia switch for controlling energization of said electromagnet, said switch being mounted on the chassis of said vehicle.

12. Seat belt retraction apparatus for use in a vehicle including a door and a chassis, said apparatus comprising:

a seat belt retractor mechanism including a reel about which the strap of the seat belt is wound and which is adapted to take up and let out said strap, said reel carrying ratchet means, said mechanism further including pawl means engageable with said ratchet means to prevent said reel from paying out said strap, said pawl means being movable between a first position in which said pawl means is out of engagement with said ratchet means and a second position wherein said pawl means engages said ratchet means to prevent payout of said strap, said pawl means including a magnetizable means;

an electromagnet positioned in operative relationship to said magnetizable means and operable from one state to a second state for generating a field causing movement of said pawl means to one of its positions;

means for biasing said pawl means to the other of its positions when said electromagnet is not energized;

an electrical circuit for controlling energization of said electromagnet, said circuit jincluding an ienrtia switch carried by said chassis and operable upon a sudden acceleration or deceleration of the vehicle to change the state of energization of said electromagnet when the door is closed.

13. Apparatus as set forth in claim 12 wherein said magnetizable means is a magnet and said magnet is positioned between said reel and said electromagnet which repels said magnet to cause said pawl means to be driven to its second position.

14. Apparatus as set forth in claim 12 wherein said inertia switch includes a bottom conductor having a depression and a ramp surface extending therefrom, conductive roller means seated in said depression, and an overlying conductor spaced from said bottom conductor, a change in velocity of said vehicle causing said roller means, due to its inertia, to move from said depression and concurrently to engage both of said conductors.

15. Apparatus as set forth in claim 14 wherein said circuit includes a capacitor which is connected so that it builds a charge when said switch is open.

16. Apparatus as set forth in claim 15 wherein said capacitor and said switch are connected in series with the gate and cathode of a SCR, the anode and cathode of which SCR are connected between a positive voltage and ground whereby closure of said switch provides a gate signal to turn on said SCR.

* * * * *

UNITED STATES PATENT AND TRADEMARK OFFICE
CERTIFICATE OF CORRECTION

PATENT NO. : 4,708,366
DATED : November 24, 1987
INVENTOR(S) : GERALD A. DOTY

It is certified that error appears in the above-identified patent and that said Letters Patent is hereby corrected as shown below:

ABSTRACT, Line 8, Change "vehical" to --vehicle--;

Column 1, Line 13, Change "retraint" --restraint--;

Column 2, Line 15, Change "moveable" to --movable--;

Column 2, Line 16, After "free" insert --from--;

Column 4, Line 10, Change "the aperture) and" to --the inertia--;

Column 4, Line 23, Change "need" to -needed--;

Column 4, Line 28, Change "is" (first occurrence) to --in--;

Column 4, Line 50, Change "Gs" to --G's--;

Column 5, Line 18, After "shown" insert --in--;

Column 5, Line 29, Change "a" to --an--;

Column 5, Line 30, Change "a" to --an--;

Column 7, Line 52, Change "mehanism" to --mechanism--;

Column 7, Line 60, Change "." to --,--;

Column 8, Line 17, Change "permeanent" to --permanent--;

UNITED STATES PATENT AND TRADEMARK OFFICE
CERTIFICATE OF CORRECTION

PATENT NO. : 4,708,366
DATED : November 24, 1987
INVENTOR(S) : GERALD A. DOTY

It is certified that error appears in the above-identified patent and that said Letters Patent is hereby corrected as shown below:

Column 8, Line 25, After "to" insert --be--.

Column 9, Line 17, Change "toward" to --towards--;

Column 9, Line 22, After "in" insert --a--;

Column 9, Line 40, After "position" insert --,--

Column 10, Line 14, Change "payout" to --pay out--;

Column 10, Line 24, Change "jincluding" to --including--;

Column 10, Line 25, Change "ienrtia" to --inertia--.

Signed and Sealed this

Twenty-first Day of June, 198

Attest:

DONALD J. QUIGG

*Attesting Officer*  *Commissioner of Patents and Trademarks*